UNITED STATES PATENT OFFICE.

DEMPSIE RAY HUNLEY, OF COFOCO, WEST VIRGINIA.

COMBINATION TROLLEY-WIRE STRETCHER AND SPLICE.

1,421,481.    Specification of Letters Patent.    Patented July 4, 1922.

Application filed August 22, 1921. Serial No. 494,289.

*To all whom it may concern:*

Be it known that I, DEMPSIE R. HUNLEY, a citizen of the United States, residing at Cofoco, in the county of Kanawha and State of West Virginia, have invented certain new and useful Improvements in Combination Trolley-Wire Stretchers and Splices; and I do declare the following to be a full, clear, and exact description of the invention, such as will enable others skilled in the art to which it appertains to make and use the same.

My invention relates to improvements in trolley wire splices and the present embodiment thereof is intended more particularly for use in splicing the trolley wires used in mines. When using splices of the forms now on the market, the broken ends of the trolley wire cannot be drawn close enough together to insert them in the ends of the splice, without taking down quite a length of the trolley wire, relieving the tension on the wire at one of its ends, or performing other equally arduous tasks. My invention, however, aims to provide a splice which is extensible for engagement with the ends of the broken wire, means being provided whereby said splice may then be shortened to draw the wire ends toward each other. The device is somewhat in the nature of a wire stretcher, but is distinguished therefrom by the fact that it remains permanently on the wire and is shaped to allow free passage of a trolley wheel or the like onto, along, and from its lower side.

With the foregoing in view, the invention resides in the novel subject matter hereinafter described and claimed, the descriptive matter being supplemented by the accompanying drawings.

Figure 1 is a side elevation of a combined stretcher and splice constructed in accordance with my invention.

Figure 2 is a central, vertical, longitudinal sectional view.

Figure 3:
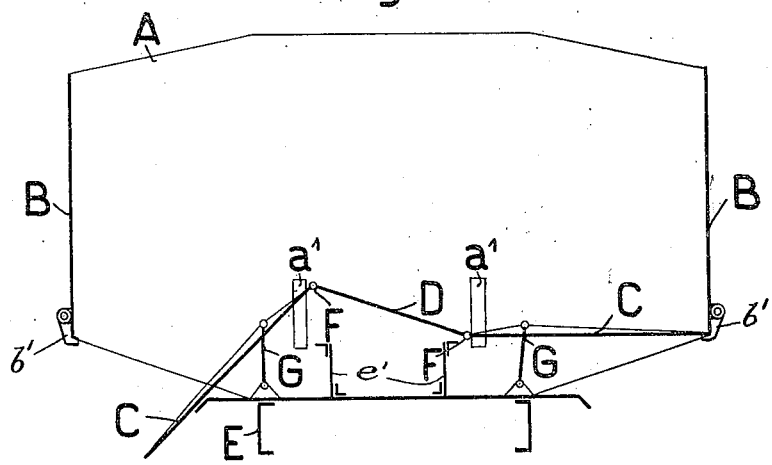
Figure 3 is a top plan view, partly in horizontal section, as indicated by line 3—3 of Fig. 2.
Figure 4:
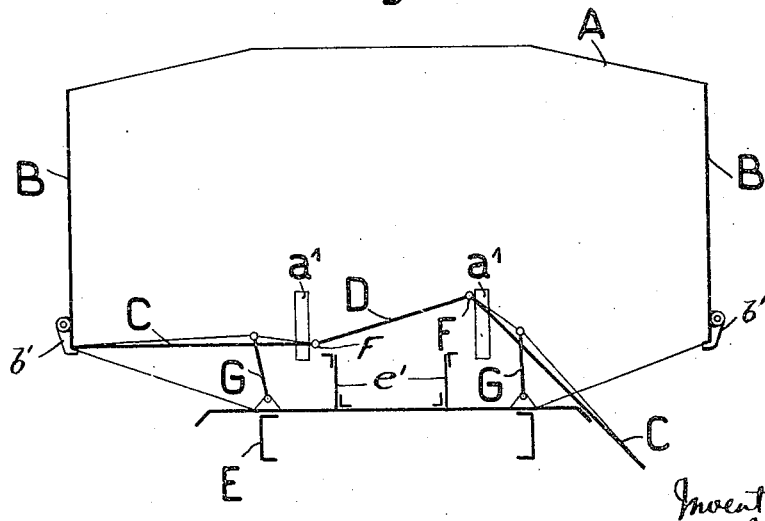

Figures 4 and 5 are vertical transverse sectional views as indicated by lines 4—4 and 5—5 of Fig. 2.

In the drawings above briefly described, the numerals 1 and 1ª designate outer and inner splice members of elongated tubular formation, said members being telescopically associated with each other as shown. The outer ends of the splice members 1 and 1ª are adapted to receive the broken ends 2 of a trolley wire when said members are slid outwardly to a suitable extent. The wire ends are then anchored in the splice members and the latter are drawn inwardly toward each other by means of a right and left-hand screw 3 whose ends are threaded through lugs 4 rising from the splice members, the center of said screw being preferably provided with a polysided enlargement 5 upon which a wrench is used.

To prevent any objectionable obstruction to passage of the usual trolley wheel or the like onto, along and from the splice, the outer ends of both splice members are thinned as indicated at 6 and the inner end of the outer section 1 is similarly thinned as at 7.

When a break occurs in the trolley wire and one of the improved splices is to be used for repairing the same, said splice is extended to such a distance as to permit the broken wire ends to be secured in the members 1 and 1ª. This having been done, the screw 3 is turned by a wrench so that the sections 1 and 1ª are drawn inwardly to pull the broken wire ends toward each other, thereby taking the slack out of the wire. Attention is directed to the fact that the entire splicing operation may be performed without disconnecting any of the trolley wire from the hangers and without placing slack in the G. IMMAND.
SELF DISCHARGING CAR.
APPLICATION FILED JAN. 14, 1921.
1,421,482.
Patented July 4, 1922.
2 SHEETS—SHEET 1.
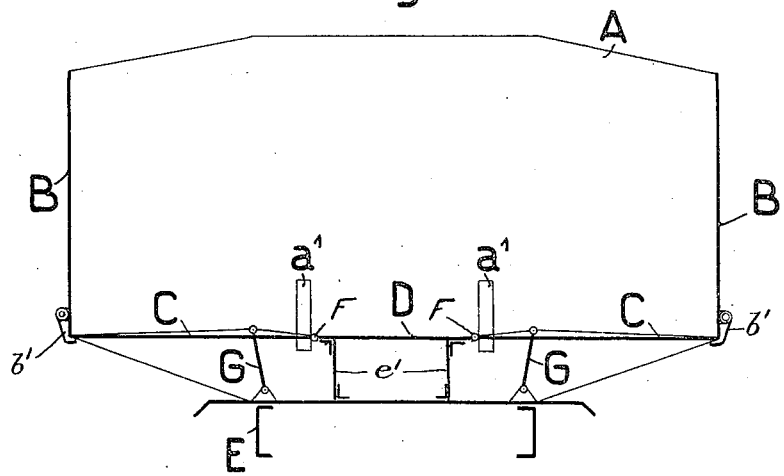
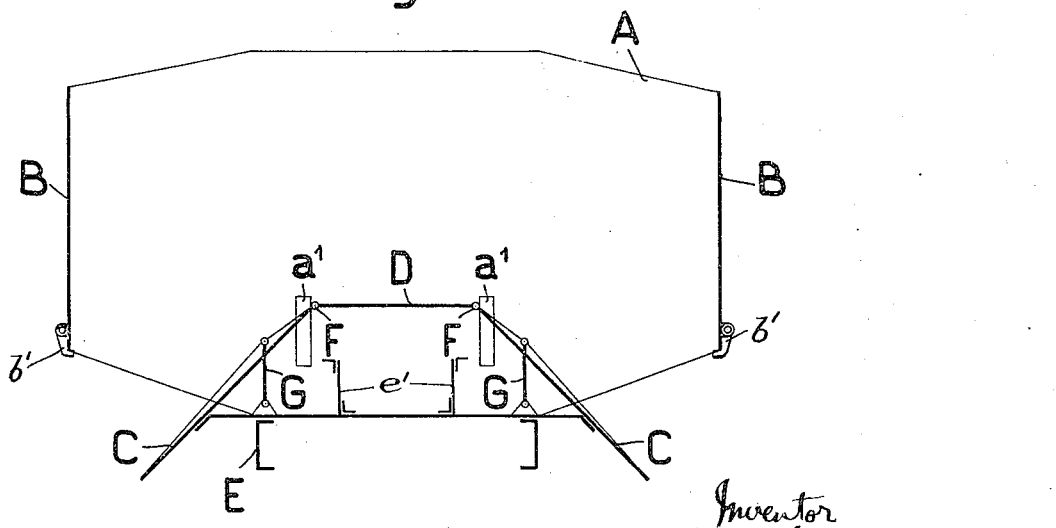

While any preferred means may be employed for securing the wire ends 2 in the splice members 1 and 1ª, I prefer to provide the construction shown. A longitudinal slot 8 is formed in the upper side of each splice member in communication with the wire receiving passage of said member, and the opposed sides of said slot 8 are formed with additional longitudinal slots 9 in which the ends of a pin 10 are slidably received. Upon this pin, the thick end of a toothed wedge 11 is mounted so that said wedge may have pivotal and sliding movement. As shown at 12, the wire receiving passage is enlarged at one end of the slot 8 so that the wedge 11 may be driven from said slot into permanent biting engagement with the trolley wire end. Wire-gripping devices, very similar to that shown have heretofore been used, but they are provided with no slots 9 and pin 10 and consequently there is great danger of losing the wedge.